United States Patent [19]

Oosterkamp

[11] Patent Number: 5,211,904

[45] Date of Patent: May 18, 1993

[54] IN-VESSEL WATER LEVEL MONITOR FOR BOILING WATER REACTORS

[75] Inventor: Willem J. Oosterkamp, Los Gatos, Calif.

[73] Assignee: General Electric Company, San Jose, Calif.

[21] Appl. No.: 624,941

[22] Filed: Dec. 10, 1990

[51] Int. Cl.$^5$ .......................................... G21C 17/035
[52] U.S. Cl. .................... 376/258; 376/247; 73/295; 141/95; 374/54
[58] Field of Search .................. 376/247, 258; 73/295; 374/54; 141/94, 95

[56] References Cited

U.S. PATENT DOCUMENTS

| | | | |
|---|---|---|---|
| 1,357,850 | 11/1920 | Derr | 73/295 |
| 4,406,011 | 9/1983 | Burns | 376/247 |
| 4,418,035 | 11/1983 | Smith | 376/247 |
| 4,423,629 | 1/1984 | Ara et al. | 73/295 |
| 4,440,717 | 4/1984 | Bevilacqua et al. | 376/247 |
| 4,583,401 | 4/1986 | Schlindwein et al. | 73/295 |
| 4,592,230 | 6/1986 | Waring et al. | 73/295 |
| 4,785,665 | 11/1988 | McCulloch | 73/295 |
| 4,915,508 | 4/1990 | McCulloch et al. | 374/166 |

FOREIGN PATENT DOCUMENTS 0006116 1/1981 Japan ...................................... 73/295

OTHER PUBLICATIONS

Termatt, K. K.; Tricoth-III; "A Hybrid Digital-/Analog Thermocouple Sensor to Measure Water Level in Nuclear Reactors", MSC Thesis, Measurement and Control Section E. R., Eindhoven Univ. of Technology and Division R & D of KEMA at Arnhem, The Netherlands, Feb. 1990.
"Design and Experience with Bicoth-Type Reactor Water Level Gauge for the Dodewaard Nuclear Power Plant", K. A. Ara, et al.
"Development of In-Vessel Water Level Gauge for the Dodewaard Nuclear Power Plant", by K. Ara, et al.
"Bicoth Water Level Sensor and Its Applicability to Measurement of In-Core Thermal/Hydraulic Performance by Ara, et al., Proceedings of a Specialist Meeting on Core Instrumentation and Reactor Assessment, Organization for Economic Cooperation and Development", Fredikstad, Norway, 1983.

Primary Examiner—Donald P. Walsh
Assistant Examiner—Chrisman D. Carroll
Attorney, Agent, or Firm—Robert R. Schroeder

[57] ABSTRACT

Apparatus and method are described for providing a discrete readout of the collapsed water level within a boiling water reactor. An elongate gauge housing is mounted within the reactor vessel extending through the collapsed level from a steam environment into a boiling water environment. A serially coupled sequence of junction defining thermocouple element pairs are positioned within the gauge housing and are arranged with a heating assembly to generate an output signal which corresponds with the water level. Also located under the influence of the heating assembly are reference thermocouples, one providing a reference output corresponding with the instantaneous temperature of the boiling water environment and the other providing a reference output corresponding with the steam environment above the collapsed water level. The signals from the reference thermocouples and the serial coupled level determining thermocouple structures are then treated to define instantaneous water level.

17 Claims, 3 Drawing Sheets

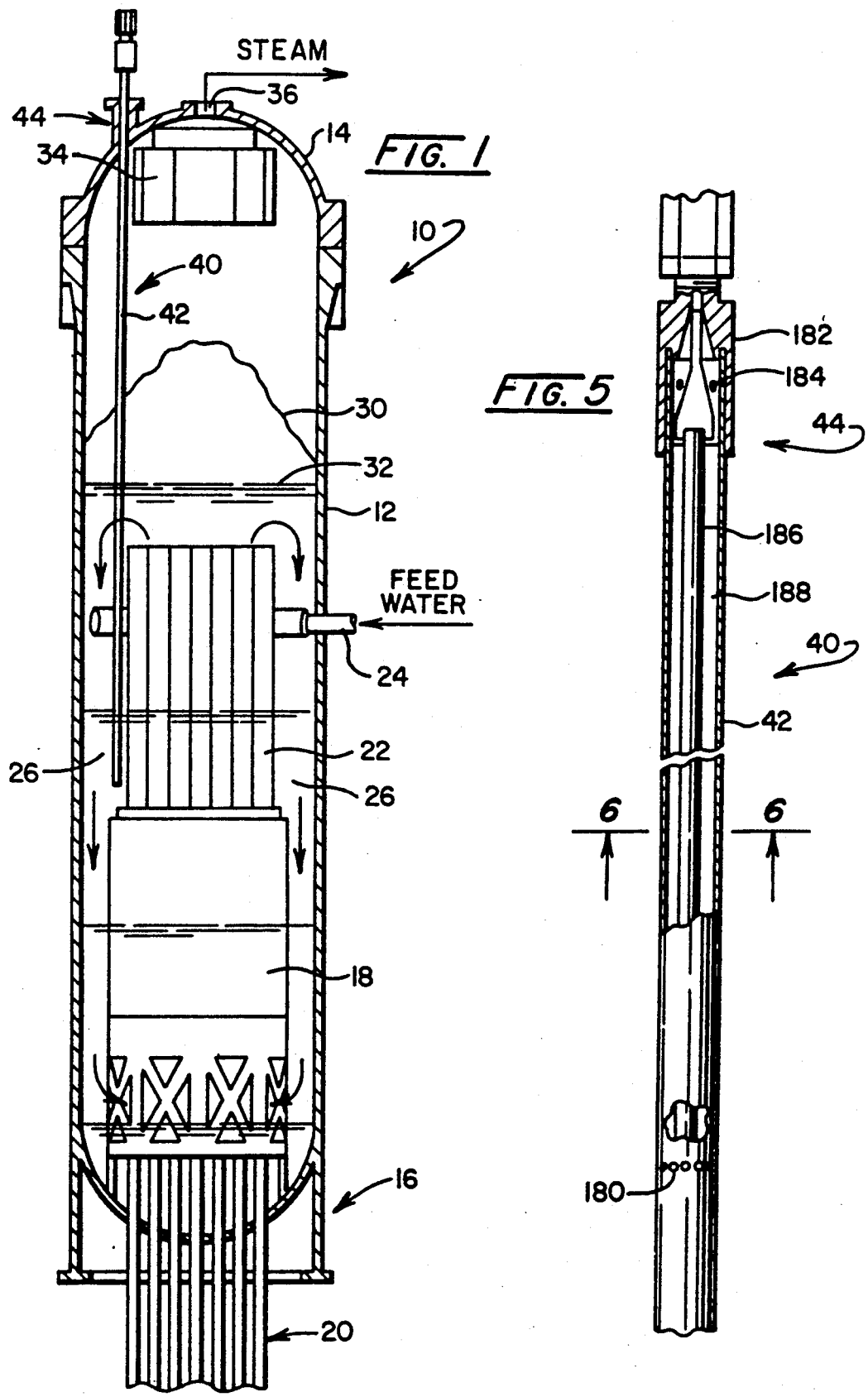

IN-VESSEL WATER LEVEL MONITOR FOR BOILING WATER REACTORS

BACKGROUND OF THE INVENTION

Boiling water reactors (BWR) are featured as the plant thermal power generator within a substantial number of nuclear power facilities. These reactors are characterized in having a steam generating architecture wherein the primary coolant, water, serves both as a reaction moderator and, being brought to boiling along the reactor core, further functions as the system working fluid. Typically, this water working fluid is recirculated through the reactor core by dual, independent recirculation loops driven, in turn, by relatively large recirculation pumps.

Within the vertically oriented reactor vessel itself, the water is circulated upwardly and undergoes steam conversion through the core situated at the vessel lower region. The water-steam mixture, then typically rises through a steam separator assembly and steam dryer structure, whereupon the steam exits to a turbine drive function. The steam-water mixture within the upper region of the reactor vessel is somewhat variable in extent, its uppermost profile being referred to as the "froth level". This is, however, not easy to measure. More commonly, a water level equivalent to the pressure differential between the top of the reactor vessel and a suitable lower point in the vessel is measured. This is referred to as the "collapsed" or "induced" level of water.

An accurate and continuous monitoring of the collapsed water level within a reactor is, of course, quite important from a general performance and safety standpoint. However, investigators have found that the power output performance characteristics, particularly of smaller reactor installations, can be improved by exerting a fine control over the induced water level within the reactor vessel. See in this regard:

Termaat. K. P.; TRICOTH-III; "A Hybrid Digital-/Analog Thermocouple Sensor to Measure Water Level in Nuclear Reactors.", MSC Thesis, Measurement and Control Section E. R., Eindhoven University of Technology and Division R&D of KEMA at Arnhem, The Netherlands; February, 1990.

A variety of techniques for monitoring or gauging the collapsed level of water within a reactor have been proposed and evaluated by investigators. For example, differential pressure transducers have been employed on the outside of the reactor vessel utilizing measuring standpipes with damping restrictions at the lower ends and water filled reference standpipes with small condensation spheres. Additionally, ultrasonic waves have been investigated as well as capacitive sensors. More recently, the utilization of heated thermocouples within the reactor vessel itself have been the subject of investigation. For example, a digital form of water level evaluation may be developed utilizing a sequence of thermocouples having selectively positioned junctions and configurations to develop a Gray type code output representing water level. A temperature differential is experienced across select ones of these thermocouple structures by virtue of their thermal influence with an elongate heated wire located adjacent to them. For example, at a water-steam interface, the heated wire will experience a greater heat sinking effect from the water component or environment than the steam component or environment to evoke a temperature differential and corresponding voltage signal output. Generally, a temperature transition function is witnessed at the water level across a given involved thermocouple which has been employed for extrapolation purposes to achieve even more accurate water level monitoring. The binary coded form of readout from such an arrangement has been found effective; however, a substantial number of leads may be involved in developing the monitoring structure which, necessarily, must be accommodated for by the supporting and penetrating structure leading through the reactor vessel top component. See additionally, the following publication:

"Bicoth Water Level Sensor and Its Applicability to Measurement of In-Core Thermal/Hydraulic Performance" by Ara, et al., Proceedings of a Specialist Meeting on Core Instrumentation and Reactor Assessment, Organization for Economic Cooperation and Development, Fredikstad, Norway, 1983.

SUMMARY

The present invention is addressed to apparatus and method for determining the level of water within a boiling water reactor. The method employs a unique geometry of thermo electric devices which are serially electrically associated to provide an output signal, the amplitude of which is uniquely correlatable with the collapsed or induced level of water within the power generating vessel. To accommodate for temperature variations in the reactor process, for example, as are encountered in start-up or coast down procedures, reference thermocouples are employed in the steam environment, as well as within the boiling water environment below vessel water level. The resultant reference signals are employed as a factor or coefficient removing ambiguity in level determination and, additionally, serve as an independent safety factor for this level monitoring approach.

Another feature of the invention provides apparatus for determining the level of water within a boiling water power generator having a steam environment above the level and a water environment below the level. The apparatus includes an elongate gauge housing mounted to extend substantially vertically through the steam environment, through the water level, and into the water environment, and includes an opening therein for receiving the water to an elevation corresponding with the aforesaid level of water. A level responsive thermocouple assemblage is provided including a serially coupled sequence of junction defining thermocouple element pairs positioned within the gauge housing for generating an output signal of amplitude corresponding with the water level. A first reference thermocouple is positioned within the generator at a location selected for substantially continuous immersion within the boiling water environment for deriving a water reference signal and a second reference thermocouple arrangement is positioned within the generator having at least a portion thereof extending above the water level within the steam environment for deriving a steam reference signal. A heater arrangement extends within the gauge housing from a predetermined upper location above the water level within the steam environment to a predetermined lower location within the boiling water environment. The heater arrangement is positioned in select heat transfer association with the level responsive thermocouple arrangement as well as the first and second reference thermocouple arrangements. This heat transfer association serves to derive select temperature differentials across the level responsive thermocouple arrangement. A signal treatment arrangement responds to the output signal, the water reference signal, and the steam reference signal to derive a readout of value corresponding to the water level.

Another feature of the invention provides a method for determining the level of water within the boiling water power generator vessel having a steam environment above the level and a water environment below the level which comprises the steps of:

providing a sequence of electrically, serially coupled, junction defining thermocouple element pairs of successively increasing lengthwise extent;

foldably configuring the thermocouple element pairs in a parallel, mutually adjacent vertical orientation wherein alternate junctions commencing with the first junction of the sequence are located at a common predetermined base level within the vessel, and wherein alternate junctions commencing with the second junction are each located at a predetermined unique level within the vessel spaced from the base level;

positioning a heating component within the vessel adjacent to and in thermal exchange relationship with the thermocouple element pairs;

applying heat to the thermocouple element pairs from the heating component through and under the heat dissipating influence of the steam environment above the water level and under the heat dissipating influence of the water environment below the water level;

detecting the amplitude of voltage output of the sequence of thermocouple element pairs; and correlating the detected amplitude with a calibration value to derive the position of the level of water within the vessel.

Another feature of the invention provides a method for determining the level of water within a boiling water power generator vessel having a steam environment above the level and a water environment below the level, comprising the steps of:

providing a substantially linear sequence of electrically serially coupled, junction defining thermocouple element pairs from first to last;

positioning the linear sequence of thermocouple element pairs vertically within the vessel extending from within the steam environment into the water environment;

providing a heating assembly formed as a linear sequence of mutually spaced, discrete heating components from first to last;

positioning the heating assembly within the vessel such that each discrete heating component, from first to last, is located in thermal exchanging adjacency with a select portion of respective first to last thermocouple element pairs;

applying heat to the thermocouple element pairs from first to last from respective first to last heating components through and under the heat dissipating influence of the steam environment above the water level and under the heat dissipating influence of the water environment below the water level to establish a differential of temperature across each thermocouple element pair;

detecting the amplitude of the output signal of the linear sequence of thermocouple element pairs; and correlating the detected amplitude with a calibration value to derive the position of the level of water within the vessel.

Other objects of the invention will, in part, be obvious and will, in part, appear hereinafter.

The invention, accordingly, comprises the apparatus and method possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a sectional schematic view of a boiling water reactor incorporating a water level monitoring apparatus according to the invention;

FIG. 5 is a partial sectional view of a water level monitor which may be employed with the vessel of FIG. 1 and which incorporates the monitoring features of the invention.

DETAILED DESCRIPTION OF THE INVENTION

Figure 6:
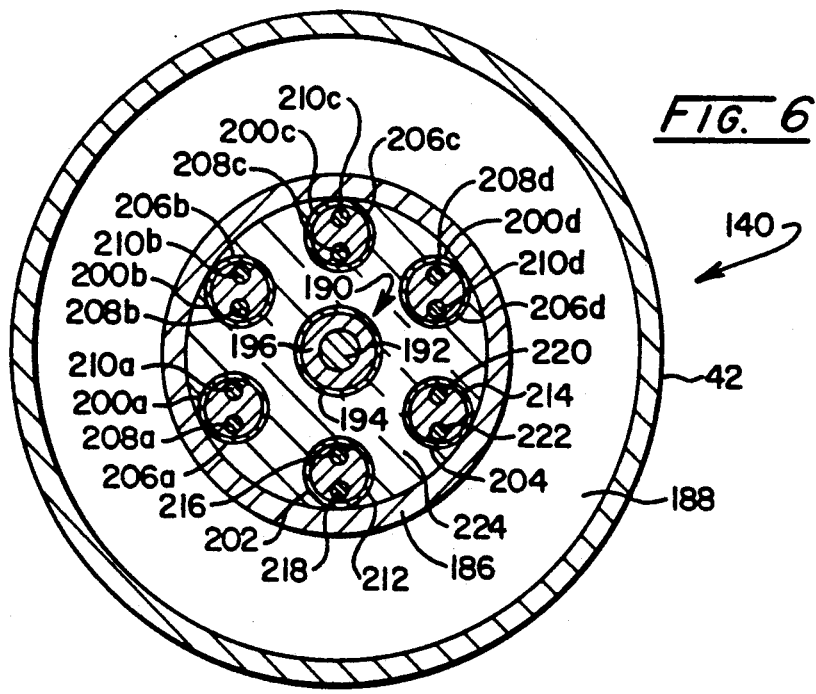
FIG. 6 is a sectional view of the monitor of FIG. 5 taken through the plane 6—6 thereof.

The water monitoring apparatus and method of the invention is based upon the use of thermo electric devices, in particular thermocouples. These devices, as opposed to, for example, continuous resistance elements and the like are essentially immune from radiation and thus find ready applicability to employment with nuclear power systems. Thermocouples find their basis in the early observations of the German physicist Thomas Johann Seebeck, who observed that when strips of different conductors were joined together at their ends and separated along their length, a magnetic field developed around the two legs, provided that a temperature difference existed between the two junctions. The phenomenon came to be known as the Seebeck effect. The magnetic field developed with the phenomenon results from an equal but opposite electric current in the leg of each metal strip caused by a thermally generated electrical potential difference between the junctions. If one junction is broken and the temperature differential is maintained, when current no longer flows, and a voltage can be measured. This generated voltage, V, is the Seebeck voltage and is related to the difference in temperature, $\Delta T$, between the heated junction and the open junction by a proportionality factor, a, called the Seebeck coefficient. Thus, $V = a\Delta T$. A variety of different metals, semi-metals, or semiconductors are employed in thermocouple formation which, in turn, evolve the value of the Seebeck coefficient. See generally Harpster, J. W. C. "Thermo Electric Power Generators", Encyclopedia Britannica, 1990. For the present applications, such materials or alloys will include, for example, alumel, chromel, constantan, and the like.

A principal application of the water level monitoring approach of the invention is with nuclear power reactors. Looking to FIG. 1, a simplified and somewhat stylized representation of a reactor vessel is represented generally at 10. The reactor 10 is representative of a design patterned for relatively lower power developments and employs a natural circulation concept. In general, the boiling water reactor (BWR) is of a 186 Mwth variety. Reactor 10 includes vessel 12 enclosed at its upward portion by cap 14 and lower structure represented generally at 16. A reactor core is represented generally at 18 which, inter alia, is under the control of control rods represented schematically at 20. Above the core 18 is a chimney structure 22 which is seen surrounded by an annular feedwater input 24. Thus configured, water circulation in the reactor 10 is generally in accordance with the arrows represented within vessel 12. In this regard, note that water flows along a downcomer annulus or channel 26 into the lower component of core 18 whereupon it is heated and rises, having a steam/water or void content of about 50% following heat exchange. Thus, a "froth level" representing the separation level between the steam/water mixture and steam is evolved as represented by the irregular outline 30. The nominal position of the water level is represented at 32 which represents a level of water equivalent to the pressure differential between the top of the reactor vessel and a suitable lower point in the vessel. This level is sometimes referred to as the "induced" or "collapsed" level and is a location wherein the water becomes saturated or slightly subcooled. Above the froth level 30, a steam separation structure is provided as represented at 34 and steam exits from the vessel cap 14 through an appropriate opening as represented at 36.

While the controls provided with the reactor 10 are carefully developed and designed with a studied redundancy, one approach to the monitoring of induced water level 32 is through the utilization of a thermocouple based elongate monitor represented generally at 40. The monitor 40 includes an elongate cylindrical gauge housing 42 which is seen to extend substantially below water level 32 into what is herein deemed a water or boiling water environment. Gauge housing 42 also extends above water level 32 into what is referred to herein as a steam environment. Penetration through the cap 14 of reactor 10 is provided at a penetration structure represented generally at 44.

Figure 2:
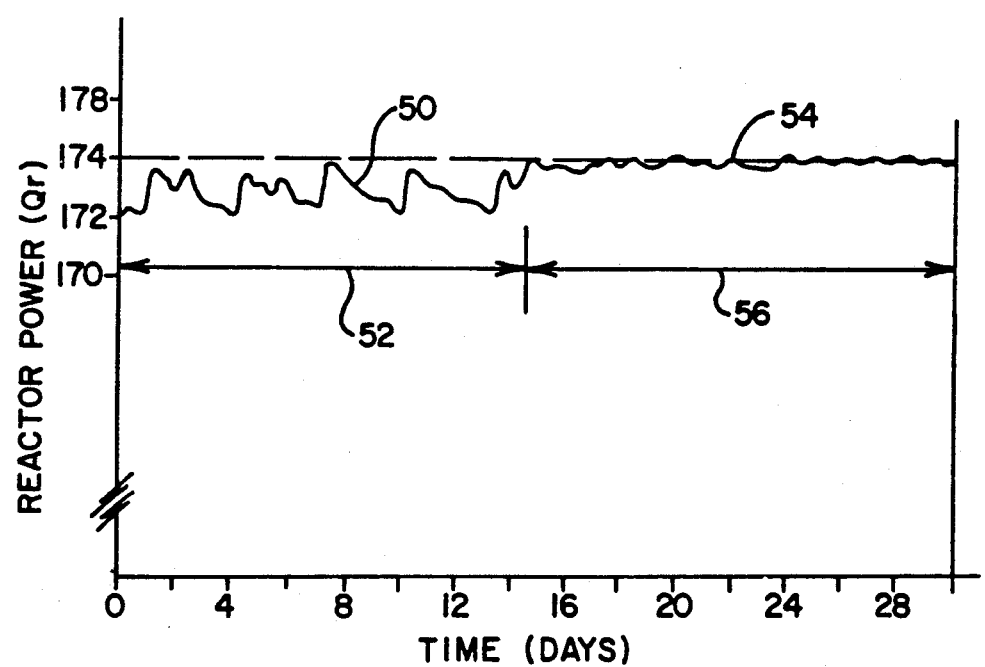
FIG. 2 is a chart showing reactor power for two different time intervals, an initial time interval without fine adjustment of water level and a succeeding time interval with such adjustment of water level.

Providing an operator with a continuous awareness of the real time position of water level 32 serves the apparent advantages of normal boiling water power generator operation. However, for the smaller power level devices, a fine control of the level 32 has additional advantages. For example, the control of power for devices at 10 conventionally has been carried out by appropriate manipulation of control rods 20 to accommodate for the expenditure of fuel. The quality of this control is limited, however, by the staccato, stepwise incrementation of positioning of control rods 20. For example, looking additionally to FIG. 2, a chart of reactor power over time and days is revealed, showing a typical power output as at curve portion 50 within the time interval represented by arrow 52. The curve 50 is typical of control of power by manipulation of rods 20. Of course, other controls utilized by the industry will allow for continuous adjustment of the rods.

Investigators have known that by evolving a rising water level or actively controlled optimum water level based upon recirculated and additive water through the reactor core, the average steam content of the core decreases with a regain of some fission reactivity loss. The result is a reactor power increase. By permitting the operator to finely control optimum water level, average power loss is reduced as is represented by curved portion 54 corresponding with a time period represented by arrow 56 in FIG. 2. Thus, considerable improvements in avoiding power loss can be achieved by affording the operator improved water level data Generally, the extent of monitoring for the instant purpose, for example, for monitors as at 40 will encompass a region of measurement extending, for example, 70 cm below water level 32 and 40 cm above it.

Figure 3:
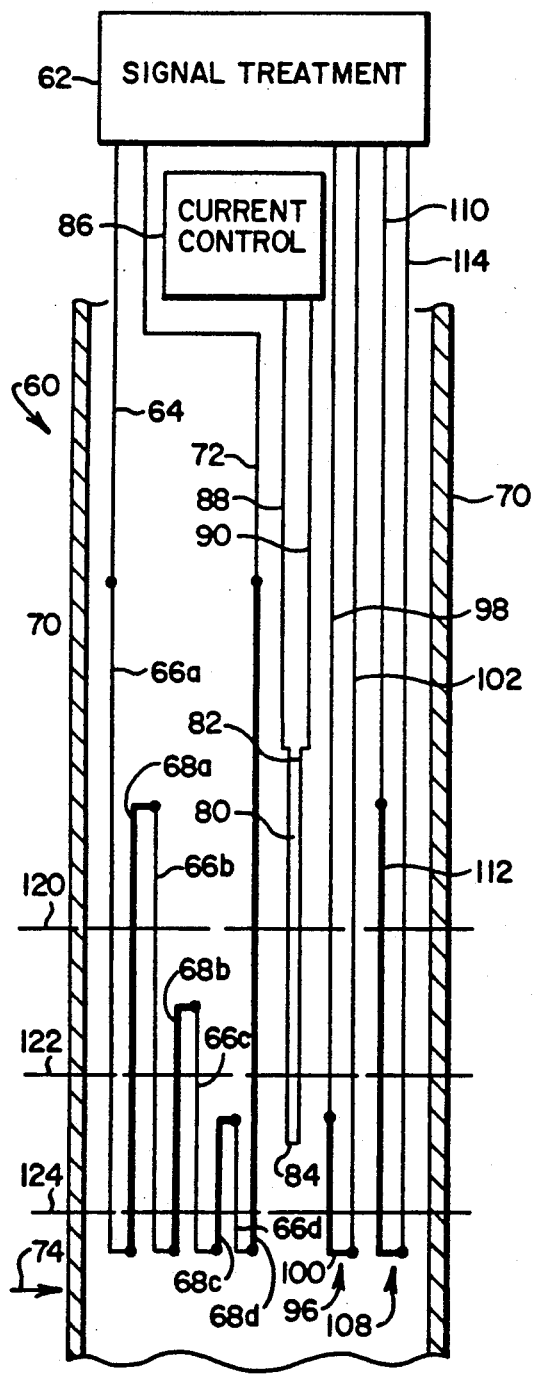
FIG. 3 is a schematic sectional representation of a folded version of the monitoring apparatus and method of the invention.

Referring to FIG. 3, a first embodiment of apparatus for determining the level 32 of water within reactor 10 is revealed in schematic form generally at 60. To facilitate an understanding of the thermocouple structuring of this apparatus 60, one junction defining thermocouple element of a given material such as, for example, chromel, is represented by a relatively thin line, while the cooperating junction defining thermocouple element, for example formed of alumel, is depicted having a heavy line. In FIG. 3, a signal treatment stage, as represented at block 62 is shown having a conventional electrical lead 64 extending to the first thermocouple element 66a of a thermocouple element pair 66a-68a. Element 66a may, for example, be chromel, while element 68a may be alumel. Thermocouple element pair 66a-68a is the first of a sequence of serially coupled junction defining thermocouple element pairs which are located within a cylindrical tubular mounting retainer schematically portrayed at 70. However, for the embodiment 60, the sequence of thermocouple element pairs are foldably configured in a parallel, mutually adjacent, vertical orientation. In this regard, note that the next succeeding thermocouple element pair is provided at 66b-68b which, in turn, is followed by thermocouple element pair 66c-68c and finally, thermocouple element pair 66d-68d. Thermocouple element 68d is seen extending upwardly to be coupled by electrical lead 72 to the signal treatment function 62.

The folded configuration of the thermocouple pair sequence represented generally at 66-68 is seen to be provided in an orientation wherein alternate junctions commencing with the first, i.e. 66a-68a are located at a common predetermined base level represented by arrow 74. Alternate junctions, for example commencing with the second junction 68a-66b are each located at a predetermined unique level within the retainer 70 and, consequently, vessel 12, and are spaced from the base level represented at arrow 74. With the arrangement, a range of signal values will be seen to be achieved, discrete unique values representing corresponding water levels.

Also positioned within the apparatus 60 is a heating component 80 extending from its upper position or terminus 82 to its lower terminus 84. Device 80 is controllably heated from a current control function represented at block 86 which provides, for example, a controlled constant current to it through paired electrical leads 88 and 90. Note, with the architecture shown, that the tip 84 of heating component 80 extends such that its heating influence is asserted to each of the thermocouple element pairs at the lowest region of position of all such thermocouple pairs.

Additionally positioned within the assemblage 60 is a boiling water reference thermocouple or water reference thermocouple represented generally at 96 and comprised of thermocouple elements 98, 100 and 102, element 98 being connected to control signal treatment function 62, the opposite input thereto being provided by element 102. Note that the thermocouple pair 100-102 is located to position a junction at base level 74 and extends to a position of influence with the lower tip 84 region of heating component 80. Additionally, the thermocouple pair 100-102 is located such that it remains within the boiling water or water environment of the vessel 12. Also contained within the assemblage 60 is a steam reference thermocouple represented generally at 108 and comprised of a sequence of thermocouple elements commencing with thermocouple element 110 which extends, in turn, to thermocouple element 112 which, in turn, is serially coupled with thermocouple element 114. The lengthwise extend of thermocouple element 112 is seen selected such that the device 108 will react to and represent a reference for the steam environment of vessel 12. Additionally, it may be observed, that the reference device 108 is within the thermal influence of heating component 80. Thermocouple elements 110 and 114 are seen extending to the signal treatment function 62 and, thus, provide a reference input thereto.

Discrete outputs or voltage values will be presented from along leads 64 and 72 to the signal treatment function 62 from the folded thermocouple assembly in correspondence with given unique water levels. In this regard, when considering a water level, for example as represented at dashed line 120, a differential of temperature, $\Delta T$, will be established across two thermocouple element pairs, for example, that at 66a and 68a as well as between element 66b and 68d. For the water level 120, a differential in temperature occurs inasmuch as a steam environment exists above that level, while a boiling water environment exists below that level. In theory, the temperature within each of these environments will be the same. However, because of the thermal contribution from heating component 80, a differential of temperature will exist inasmuch as a greater amount of thermal dissipation or "heat sinking" will occur within the boiling water environment than will occur in the adjacent steam environment. Two, substantially identical voltage values will be generated, therefor from the two affected thermocouple pairs, the sum of which is witnessed at the signal treatment function 62. Function 62 treats this value in correspondence with the reference values from reference thermocouples 96 and 108 employing any desired factor or coefficient derived therefrom. The latter information maintains the accuracy of the level measuring system even though temperature variations of the water-steam environment within the reactor may be witnessed, for example, as may occur during start-up or cool down procedures.

A next arbitrary water level is represented by a dashed line 122. At this water level, the temperature differential will be witnessed at paired thermocouple elements 66a and 68a, at paired thermocouple elements 66b and 68b, and in consequence of the temperature differential across thermocouple elements 66c and 68d. Thus, an output is present at leads 64 and 72 as directed to signal treatment function 62 which represents the sum of three thermocouple devices having a water level induced differential of temperature developed across them.

Finally, another arbitrary induced or collapsed water level is represented by dashed line 124. At this level, a combination of the outputs of four thermocouple elements pairs are summed to present a corresponding output from leads 64 and 72 to the signal treatment function 62. In this regard, a thermocouple pair comprised of element 66a and 68a will produce an output; the pair represented by thermocouple elements 66b and 68b will produce an output; the thermocouple pair represented by thermocouple elements 66c and 68c will produce an output; and thermocouple element pair 66d and 68d will produce an output.

Figure 4:
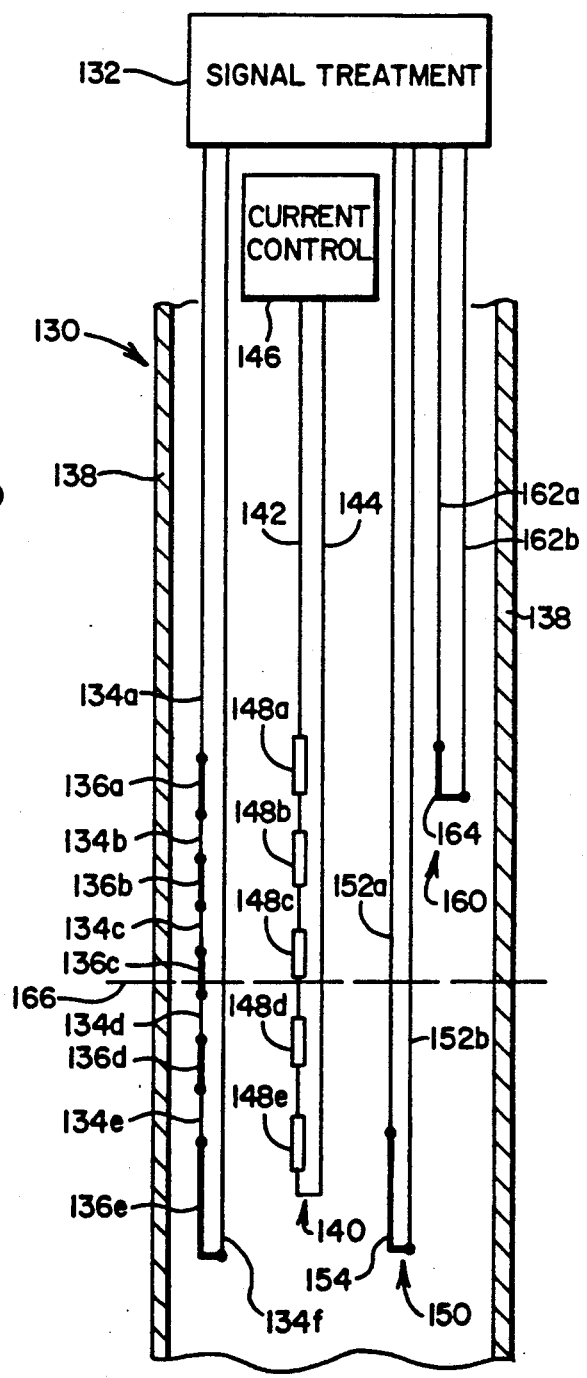
FIG. 4 is a schematic sectional representation of an unfolded version of the monitoring apparatus and system of the invention.

Another embodiment of the serially coupled thermocouple element pair approach to water level monitoring is revealed in FIG. 4. Looking to that figure, monitoring apparatus is represented generally at 130 as including, as before, a signal treatment function represented at block 132 from which extends a substantially linear sequence of electrically serially coupled, junction defining thermocouple element pairs, the alternate elements of which are represented at 134a-134f which, for example, may be formed of chromel and which are serially interconnected with alternating thermocouple elements 136a-136e which may, for example, be formed of alumel. These elements, along with a heating assembly and reference thermocouples are retained within a tubular mounting retainer represented at 138. The heating assembly is depicted generally at 140 and is seen to be comprised of input leads 142 and 144 extending, for example, from a current control function represented at block 146 and which supply current to a linear sequence of mutually spaced discrete heating components 148a-148e. This spacing of components 148a-148e is such that a temperature differential will continuously occur across adjacent and associated paired thermocouple elements. For example, a temperature differential will be created by the spaced positioning of heater components 148a and 148b. For those thermally affected thermocouple pairs which are present in the steam environment, this temperature differential or $\Delta T$ will be of a higher magnitude due to lower thermal dissipation or heat sinking within the steam environment. Correspondingly, for those thermocouple pairs and heating components which lie below the collapsed water level, a more pronounced heat sinking effect or thermal dissipation will be occasioned by the water environment and a lesser differential temperature will be created within the associated thermocouple element pairs. Thus, the output signal developed at components 134a and 134f, as presented to the signal treatment function 132, will be a summation of higher voltages generated above the water level and lower voltages generated below the water level.

As before, a water reference thermocouple as represented generally at 150 is positioned within the retainer 138 at a location assuring its presence within the boiling water environment on a continuous basis. Reference thermocouple 150 is seen comprised of thermocouple elements 152a, 154, and 152b. As before, elements 152a and 152b may be formed of chromel and, correspondingly, element 154 may be formed of alumel. Note that the thermocouple pairs reside under the differential temperature inducing influence of, for example, heating component 148e. Accordingly, a signal is directed to the signal treatment function 132 which is representative of the thermal condition or temperature of the water environment. Correspondingly, a steam reference thermocouple represented in general at 160 provides a reference output signal corresponding with the steam environment above water level. Device 160 is seen formed of thermocouple elements 162a and 162b positioned at either end of thermocouple element 164. Device 160 is in thermal exchange adjacency, for example, with heating component 148a in a manner evoking a temperature differential thereacross to generate a steam reference signal for presentation to the signal treatment function 132.

In its general operation, assuming, for example, a water level represented by dashed line 166, a total of n serially coupled junction defining thermocouple element pairs are present of which w numbers of those pairs are below water level 166 and thus influenced by the water environment. Assigning the steam reference thermocouple as 160 developing a coefficient represented as, a, and the water reference device 150 generates a water reference signal, s, designated as b, then, the signal presented as an output signal to the signal treatment function 132 may be represented by the following expression:

$$S = (n-w)a + wb$$

This expression is readily solved for, w, which is correlated to water level.

Turning to FIG. 5, a partial sectional view of the monitor 40 as described in conjunction with FIG. 1 is revealed in enhanced detail. The monitor 40 will have the earlier-described protective pipe-shaped gauge housing 42 which is so configured as to permit the entry thereinto of water, for example through holes as at 180. The housing 42 is secured at a penetration structure 44 cap 182 which, in turn, is removably, insertably mounted within the vessel cap 14. Venting holes and the like, for example as at 184, are provided within the structure 40 for the purpose of permitting the collapsed or induced water level of the vessel 12 to be defined within the interior of gauge 42. Positioned centrally of the gauge housing 42 is a heater assembly and thermocouple assembly mounting pipe 186. Note that the pipe 186 extends centrally within the gauge housing 42 and is spaced from the internal surface thereof to provide an annulus 188 within which the noted induced or collapsed water level of the reactor 12 may be developed.

Turning additionally to FIG. 6, a sectional view of the monitor 40 is revealed, the gauge housing 42 again being reproduced by the same numeration and the annulus 188 being identified intermediate the housing 42 and outer surface of mounting pipe 186. Within the mounting pipe 186, there is seen to be a heater assembly represented generally at 190 which includes a heater element 192. Heater element 192 is positioned within a protective sheath 194 which is filled within isolation material 196 such as aluminum oxide. Positioned outwardly of the heater assembly 190 are four thermocouple assemblies 200a–200d and two reference thermocouples, a steam reference thermocouple assembly 202 and a water reference thermocouple 204. Each of the level responsive thermocouple assemblies 200a–200e is formed having an outwardly disposed ground sheath 206a–206d and a thermocouple element pair as represented respectively at 208a–208d and 210a–210b. The ground sheaths as at 208a–208d are filled with a thermally conductive isolation material such as the earlier-noted aluminum oxide. Water reference thermocouple 202 and steam reference thermocouple 204 are similarly structured, having respective ground sheaths 212 and 214 along with thermocouple elements as represented, respectively, at 216, 218, and 220, 222. As before, the ground sheaths 218 and 222 are filled with an insulator such as aluminum oxide. Additionally, the mounting pipe with thermocouples and heating element therewith is filled with a thermally conductive isolation material such as aluminum oxide, that region being depicted in general at 224.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. Apparatus for determining the level of water within a boiling water power generator having a steam environment above said level and a saturated or slightly subcooled water environment below said level, comprising:

an elongate gauge housing mounted to extend substantially vertically through said steam environment, through said water level and into said boiling water environment and having an opening therein for receiving said water to an elevation corresponding with said level thermocouple means including a serially coupled sequence of junction defining thermocouple element pairs positioned within said gauge housing for generating an output signal of amplitude corresponding with said water level;

first reference thermocouple means mounted within said generator and having a lengthwise extent selected for substantially continuous immersion within said water environment, for deriving a water reference signal independent of said output signal;

second reference thermocouple means mounted within said generator and having a length selected to position at least a portion thereof to extend above said water level within said steam environment for deriving a steam reference signal independent of said output signal;

heater means extending from a predetermined upper location above said water level within said steam environment to a predetermined lower location within said water environment, positioned in select heat transfer association with said level responsive thermocouple means, said first reference thermocouple means, and said second reference theremocouple means, for deriving select temperature differentials across said level responsive thermocouple means; and signal treatment means responsive to said output signal, said water reference signal and said steam reference signal for deriving a readout of value corresponding to said water level.

2. The apparatus of claim 1 in which said level responsive thermocouple means are foldably configured in mutually adjacent vertical orientations to position a first predetermined number, n, of alternate said junction defining thermocouple element pairs commencing with a first said junction at a common, predetermined base level defining location within said gauge housing, and a second predetermined number, less than said number, n, commencing with a second said junction of alternate said junction defining thermocouple element pairs at unique, predetermined level defining locations within said gauge housing spaced from said base level defining location.

3. The apparatus of claim 1 in which said heater means is a continuous, elongate heater element extending within said gauge housing.

4. The apparatus of claim 2 in which said second predetermined number of thermocouple element pairs is n−1.

5. The apparatus of claim 1 in which said heater means is provided within said gauge housing at a location within said boiling water environment effective to cause the formation of a temperature differential across said first reference thermocouple means to effect generation of said water reference signal.

6. The apparatus of claim 1 in which said heater means is provided within said generator at a location within said steam environment effective to cause the formation of a temperature differential across said second reference thermocouple means to effect generation of said steam reference signal.

7. The apparatus of claim 1 in which:
said first reference thermocouple means comprises a first junction defining thermocouple element pair of given length vertically positioned within said gauge housing; and
said heater means comprises a heating element positioned adjacent to a select portion of said given length of said first junction defining thermocouple element pair in thermal exchange relationship therewith to establish a boiling water environment responsive temperature differential thereacross effecting generation of said water reference signal.

8. The apparatus of claim 1 in which:
said second reference thermocouple means comprises a second junction defining thermocouple element pair of given length vertically positioned within said generator; and
said heater means comprises a heating element positioned adjacent to a select portion of said given length of said second junction defining thermocouple element pair in thermal exchange relationship therewith to establish a steam environment responsive temperature differential thereacross effecting generation of said steam reference signal.

9. The apparatus of claim 1 in which:
said level responsive thermocouple means comprises an elongate sequence of serially coupled, junction defining thermocouple element pairs disposed in a linear, vertical orientation along the length of said gauge housing; and
said heater means comprises a vertically oriented sequence of discrete heating components each being located in thermal exchange adjacency with a select one of said junction defining thermocouple element pairs.

10. The apparatus of claim 9 in which:
said first reference thermocouple means comprises a first junction defining thermocouple element pair of given length, vertically positioned within said generator; and
a said heater means discrete heating component is located in thermal exchange adjacency with a portion of said given length of said first junction defining thermocouple to establish a boiling water environment responsive temperature differential thereacross effecting generation of a said water reference signal.

11. The apparatus of claim 9 in which:
said second reference thermocouple means comprises a second junction defining thermocouple element pair of given length, vertically positioned within said generator; and
a said heater means discrete heating component is located in thermal exchange adjacency with a portion of said given length of said second junction defining thermocouple to establish a steam environment responsive temperature differential thereacross effecting generation of a said steam reference signal.

12. The method for determining the level of water within a boiling water power generator vessel having a steam environment above said level and a saturated or slightly subcooled water environment below said level, comprising the steps of:
providing a sequence of electrically serially coupled, junction defining thermocouple element pairs of successively increasing lengthwise extent;
foldably configuring said thermocouple element pairs in a parallel, mutually adjacent vertical orientation wherein alternate said junctions commencing with the first said junction of said sequence are located at a common, predetermined base level within said vessel, and wherein alternate said junctions commencing with the second said junction are each located at a predetermined unique level within said vessel spaced from said base level;
positioning a heating component within said vessel adjacent to and in a thermal exchange relationship with said thermocouple element pairs;
applying heat to said thermocouple element pairs from said heating component through and under the heat dissipating influence of said steam environment above said water level and under the heat dissipating influence of said water environment below said water level;
detecting the amplitude of voltage output of said sequence of thermocouple element pairs; and
correlating said detected amplitude with a calibration value to derive the position of said level of water within said vessel.

13. The method of claim 12 including the steps of:
providing a water reference thermocouple within said vessel at a location within said water environment selected for substantially continuous immersion;
applying heat to a portion of said water reference thermocouple from said heating component to derive a water reference signal; and
carrying out said correlation step in correspondence with the value of said water reference signal.

14. The method of claim 12 including the steps of:
providing a steam reference thermocouple within said vessel at a predetermined location having at least a portion within said steam environment;
applying heat to a portion of said steam reference thermocouple from said heating component to derive a steam reference signal; and
carrying out said correlation step in correspondence with the value of said steam reference signal.

15. The method of claim 14 including the steps of:
providing a water reference thermocouple within said vessel at a location within said boiling water environment selected for substantially continuous immersion;

applying heat to a portion of said water reference thermocouple from said heating component to derive a water reference signal; and carrying out said correlation steps additionally in correspondence with the value of said water reference signal.

16. The method for determining the level of water within a boiling water power generator vessel having a steam environment above said level and a saturated or slightly subcooled water environment below said level, comprising the steps of:

providing a substantially linear sequence of electrically serially coupled, junction defining thermocouple element pairs from first to last;

positioning said linear sequence of thermocouple element pairs vertically within said vessel extending from within said steam environment into said water environment;

providing a heating assembly formed as a linear sequence of mutually spaced discrete heating components from first to last;

providing a water reference thermocouple within said vessel at a location within said water environment selected for substantially continuous immersion;

providing a steam reference thermocouple within said vessel at a predetermined location having at least a portion within said steam environment;

positioning said heating assembly within said vessel such that a respective said discrete heating component, from first to last, is located in thermal exchanging adjacency with a select portion of respective first to last thermocouple element pairs, said water reference thermocouple and said steam reference thermocouple;

applying heat to said thermocouple element pairs from first to last from said respective heating components through and under the heat dissipating influence of said steam environment above said water level and under the heat dissipating influence of said water environment below said water level to establish a differential of temperature across each said thermocouple element pair, said heat application being to a portion of said water reference thermocouple from said respective heating component to derive a water reference signal and to a portion of said steam reference thermocouple from said respective heating component to derive a steam reference signal;

detecting the amplitude of an output signal generated by said linear sequence of thermocouple element pairs, said water reference thermocouple and said steam reference thermocouple; and correlating said detected amplitude with said water and steam reference signals to derive the position of said level of water within said vessel.

17. The method of claim 16 in which said correlation step is carried out in correspondence with the expression: $S=(n-w)a+wb$, where S corresponds with the value of said output signal, n corresponds with the total number of said thermocouple element pairs, w corresponds with the number of said thermocouple element pairs within said steam environment and is correlatable with said water level, a corresponds with said water reference signal, and b corresponds with said steam reference signal.

* * * * *